United States Patent
Madsen et al.

(10) Patent No.: US 12,078,152 B2
(45) Date of Patent: Sep. 3, 2024

(54) METHOD FOR OPERATING AT LEAST ONE WIND TURBINE AND WIND TURBINE OR GROUP OF WIND TURBINES

(71) Applicant: Siemens Gamesa Renewable Energy A/S, Brande (DK)

(72) Inventors: Finn Daugaard Madsen, Billund (DK); Poul Skjaerbaek, Videbaek (DK); Jan Thisted, Tjele (DK); Jens Thomsen, Brande (DK); Henrik Bach Mortensen, Viborg (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 17/790,780

(22) PCT Filed: Jan. 11, 2021

(86) PCT No.: PCT/EP2021/050401
§ 371 (c)(1),
(2) Date: Jul. 5, 2022

(87) PCT Pub. No.: WO2021/151645
PCT Pub. Date: Aug. 5, 2021

(65) Prior Publication Data
US 2023/0042604 A1 Feb. 9, 2023

(30) Foreign Application Priority Data
Jan. 29, 2020 (EP) .................................. 20154323

(51) Int. Cl.
*F03D 9/00* (2016.01)
*F03D 9/19* (2016.01)
(Continued)

(52) U.S. Cl.
CPC ............... *F03D 9/19* (2016.05); *F03D 9/255* (2017.02); *F05B 2220/61* (2013.01);
(Continued)

(58) Field of Classification Search
CPC .......... F03D 9/19; F03D 9/255; F03D 7/0284; F03D 7/042; F03D 9/25; F05B 2220/61;
(Continued)

(56) References Cited

U.S. PATENT DOCUMENTS

| 5,592,028 A | 1/1997 | Pritchard |
| 7,075,189 B2 | 7/2006 | Heronemus et al. |

(Continued)

FOREIGN PATENT DOCUMENTS

| CN | 107769255 A | 3/2018 |
| WO | 02084839 A2 | 10/2002 |
| WO | 2013087553 A1 | 6/2013 |

OTHER PUBLICATIONS

PCT International Search Report and Written Opinion of International Searching Authority mailed Apr. 22, 2021 corresponding to PCT International Application No. PCT/EP2021/050401 filed Jan. 11, 2021.

*Primary Examiner* — Julio C. Gonzalez
(74) *Attorney, Agent, or Firm* — Schmeiser, Olsen & Watts LLP

(57) ABSTRACT

A method for operating at least one wind turbine is provided, the wind turbine being electrically coupled to a power-to-gas converter and an electric grid, wherein a control unit determines a power level for the power generated by at least one generator of the at least one wind turbine and at least partially feeds the generated power to the power-to-gas converter when the determined power level reaches or exceeds a given lower threshold value, wherein the amount of power fed to the power-to-gas converter is kept constant (Continued)

Figure 1:
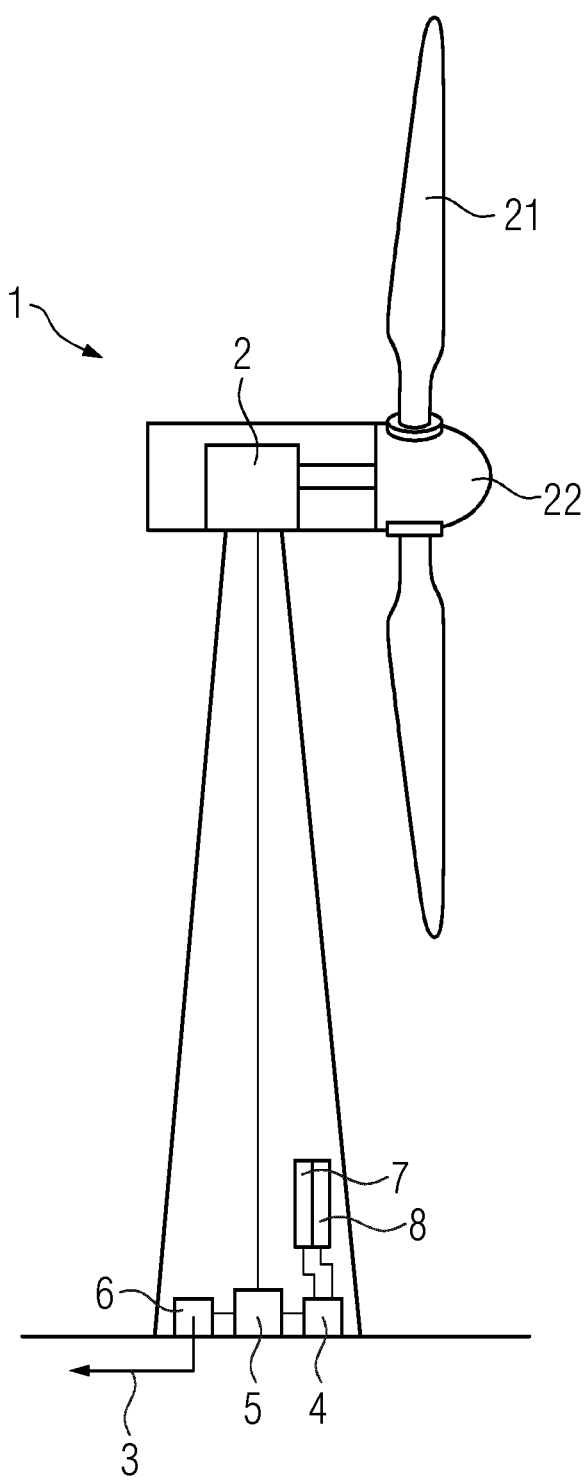

when the determined power level reaches or exceeds a given upper threshold value.

7 Claims, 2 Drawing Sheets

(51) Int. Cl.
  *F03D 9/25* (2016.01)
  *H02J 15/00* (2006.01)
(52) U.S. Cl.
  CPC .......... *F05D 2220/76* (2013.01); *H02J 15/008* (2020.01); *H02J 2300/28* (2020.01)
(58) Field of Classification Search
  CPC ............ F05B 2220/706; F05D 2220/76; H02J 15/008; H02J 2300/28; H02J 3/28; H02J 3/48; H02J 3/38; Y02E 10/72; Y02E 10/76; Y02E 60/36
  See application file for complete search history.

(56) References Cited

U.S. PATENT DOCUMENTS

| | | | |
|---|---|---|---|
| 7,199,482 B2 | 4/2007 | Hopewell | |
| 7,471,010 B1* | 12/2008 | Fingersh | F03D 9/11 290/43 |
| 2007/0079611 A1* | 4/2007 | Doland | C25B 1/04 60/495 |
| 2007/0216165 A1* | 9/2007 | Oohara | H02P 9/00 290/44 |
| 2014/0352311 A1* | 12/2014 | De Boer | F03D 9/257 290/44 |

* cited by examiner

METHOD FOR OPERATING AT LEAST ONE WIND TURBINE AND WIND TURBINE OR GROUP OF WIND TURBINES

CROSS-REFERENCE TO RELATED APPLICATIONS

This application claims priority to PCT Application No. PCT/EP2021/050401, having a filing date of Jan. 11, 2021, which claims priority to EP Application No. 20154323.8, having a filing date of Jan. 29, 2020, the entire contents both of which are hereby incorporated by reference.

FIELD OF TECHNOLOGY

The following relates to a method for operating at least one wind turbine, the wind turbine being electrically coupled to a power-to-gas converter and an electric grid, wherein a control unit determines a power level for the power generated by at least one generator of the at least one wind turbine and at least partially feeds the generated power to the power-to-gas converter when the determined power level reaches or exceeds a given lower threshold value. Additionally, embodiments of the invention concerns a wind turbine or group of wind turbines.

BACKGROUND

Wind turbines are a highly relevant source of renewable energy. The power generated by a wind turbine strongly depends on the current wind speed. While a relatively constant power output can be achieved once the wind speed reaches a certain threshold, in many cases wind turbines are operated for a notable part of their operation time in a wind speed regime where the power output is strongly correlated to the wind speed.

If the bulk of power in an electric grid is provided by wind turbines, e.g. by offshore wind farms, it would be necessary to provide a sufficient power even at times of low wind speeds. This would however lead to a very high power output at times of higher wind speeds. This could require the electric grid to be expanded to handle the large power output and might also be problematic for economic reasons. The alternative would be burning off the excess power, e.g. by heating a resistor, controlling the wind turbines to produce less power or similar wasteful approaches. It would in principle also be possible to use other energy sources, e.g. gas power plants, within the same electric grid to compensate for power fluctuations. This might however not be desirable when a maximum usage of renewable energy is desired.

To alleviate this problem it is known from the conventional art to use at least part of the power generated by a wind turbine to drive a power-to-gas converter, e.g. an electrolyzer to generate hydrogen. Examples for this approach are disclosed in the documents U.S. Pat. Nos. 5,592,028 A, 7,075,189 A and 7,199,482 A. The document U.S. Pat. No. 7,471,010 suggests to use a wind turbine tower as a gas storage facility. Generated gas can be turned back into electric power as discussed e.g., in the document WO 02/084839 A2.

The document CN 107 769 255 A discloses a variable-speed constant-frequency wind power generation system. At low wind speeds and during a spin up of the wind turbine at low speeds the quality of generated power is not sufficient to feed it to the grid and the power is therefore exclusively fed to an electrolysis cell to generate hydrogen. Once a cut-in speed is reached, the generator stops supplying power to the electrolytic cell and is connected to the grid. The power then continuously increases with increasing wind speed until the rated power is reached. Once the wind turbine reaches the rated power the generator additionally supplies at least one electrolytic cell to further increase the total power.

An approach for providing a relatively constant power level during relatively short time intervals to an electric grid is discussed in the document WO 2013/087553 A1. This document suggests to predict a minimum wind speed and therefore a minimum of the power output for a given prediction interval and then limit the power level provided to the electric grid to this level or below this level. Excess power is then used to drive a power-to-gas converter. While this approach improves the predictability of the power output of the wind turbine, the power level provided to the electric grid can still strongly vary over time, especially if relatively short forecast intervals are used. Using long forecast intervals with strong variations in wind speed will however lead to relatively strong reduction in the amount of power that can be output to the electric grid and also requires a relatively large capacity of the power-to-gas converter, that can noticeably increase the cost of the wind turbine.

SUMMARY

An aspect relates to provide a method for operating at least one wind turbine that at least partially alleviates the problem of high peak power output to an electric grid when a large amount of the power is provided by wind turbines while at the same time allowing for a relatively low cost of implementation of the wind turbine. The method should allow for a relatively constant output of power to the electric grid in a wide variety of usage conditions.

The problem is solved by the initially discussed method for operating at least one wind turbine, wherein the amount of power fed to the power-to-gas converter is kept constant when the determined power level reaches or exceeds a given upper threshold value.

By keeping the power fed to the power-to-gas converter constant once the determined power level reaches or exceeds the upper threshold value, the capacity of the used power-to-gas converter can be freely chosen. As will be discussed in detail below, it is especially possible to choose the capacity of the power-to-gas converter in such a way that the maximum capacity is reached when the power level provided to the power-to-gas converter is equivalent to the difference between the upper and lower threshold value. This creates a plateau in the power level provided to the electric grid between the lower and the higher threshold value therefore ensuring that the at least one wind turbine can provide a relatively constant power level to the electric grid over a large range of operating conions. At the same time the capacity of the power-to-gas converter can be relatively low, therefore keeping the cost for the wind turbine or group of wind turbines low.

Limiting the amount of power provided to the power-to-gas converter is especially advantageous when a higher output of power beyond the upper threshold is only expected for relatively short time intervals, e.g., a few daily production hours. In this case using a power-to-gas converter rated for the peak output of the wind turbine would noticeably increase costs while only increasing the produced amount of gas by a relatively small amount. The power output to the electric grid once an upper threshold is used can e.g., be used to compensate for other wind turbines in the wind farm and therefore allow for servicing of these wind turbines etc.

The power level of the power generated by the at least one generator can be measured, e.g., by the control unit or e.g. be calculated from a current wind speed or rotational speed of the generator or generators. The wind turbine can be designed in such a way that the generator always feeds at least some power to the electric grid, at least when more power is produced than the power requirements of the wind turbine itself.

The power fed to the power-to-gas converter can be kept constant when the determined power level reaches or exceeds the upper threshold value by feeding power exceeding the upper threshold value to the electric grid. It is therefore e.g., possible to increase the amount of a power fed to the electric grid until the maximum power output of the wind turbine is reached.

To avoid damage to the wind turbine or other components carrying the generated power, it is possible to switch the wind turbine to a shutdown state once a shutdown threshold of the wind speed, the rotational speed of the blades or a similar parameter is reached. It is e.g., possible to brake the wind turbine to a standstill. The initiation of a shutdown state in certain conditions is known from the conventional art and will not be discussed in detail. Obviously, the power fed to the power-to-gas converter and the electric grid is reduced to zero during the shutdown procedure and therefore not kept constant.

A constant amount of power can be fed to the electric grid when the determined power level is between the lower threshold value and the upper threshold value by varying the amount of power fed to the power-to-gas converter. A none zero amount of power is fed to the electric grid in this case. The lower threshold value can be considered to be the electrical power rating of the wind turbine with respect to the electric grid that is only exceeded when the upper threshold value is reached. If the lower threshold is chosen in such a way that it corresponds only to a small part of the maximum power that can be generated by the wind turbine or of the upper threshold value, the power output to the grid saturates a relatively early and is kept constant in most operating conditions once the lower threshold value is reached.

All of the power generated by the at least one generator, and especially not used for the operation of the wind turbine itself, can be fed to the electric grid when the determined power level is at or below the lower threshold value. In other words none of the generated power or only a small amount of the power that might be necessary for a standby mode of the power-to-gas converter is fed to the power-to-gas converter. Therefore, no gas is produced while the determined power level is at or below the lower threshold value therefore ensuring an optimum power output to the electric grid.

At very low wind speed it might not be possible to effectively generate power by the wind turbine. It is e.g., possible that the operation of the electronics of the wind turbine would require larger amounts of power than the power that would be generated by the generator in this case. Therefore, it is possible to use a threshold wind speed, below which there is no generated power and therefore no power provided to the electric grid.

The upper and/or lower threshold value can be determined during the production of the wind turbine and/or depend on a power rating of the power-to-gas converter and/or can be manually adjusted by a user. Alternatively, the upper and/or lower threshold could be dynamically determined during the operation of the wind turbine, e.g. based on a predicted wind speed and/or a current power price and/or other factors.

A manual adjustment by the user or a dynamic determination of the thresholds can be limited by certain factors. It is e.g., possible to only allow an adjustment of the thresholds that keeps the difference of the thresholds at or below a capacity rating of the power-to-gas converter. This ensures that all additional power generated between the thresholds can be fed to the power-to-gas generator. It is also possible that the dynamic or manual adjustment of at least one of the thresholds is limited to a predetermined range that can e.g., depend on parameters of the wind turbine. E.g., the maximum difference between the maximum power output of the wind turbine and the upper threshold can be limited to ensure a relatively even power output of the wind turbine.

The at least one wind turbine can be designed to provide a given maximum power, wherein the first threshold value can correspond to between 30% and 50% of the maximum power and/or wherein the upper threshold value can correspond to 75% to 95% of the maximum power. The lower threshold value can be in the range between 45% and 55% of the maximum power and can especially be 40% of the maximum power. The upper threshold value can be between 80% and 90% of the maximum power, or 85%. If e.g., the wind turbine or group of wind turbines is rated from a maximum power output of 10 MW, the first threshold value can be chosen to be 4 MW and the second threshold value can be chosen to be 8.5 MW. In this case it is e.g., possible to provide all power generated up to 4 MW to the electric grid, to provide up to 4.5 MW of power that is produced in excess of 4 MW to the power-to-gas converter and to provide the last 1.5 MW that can be generated to the electric grid, therefore increasing the power output to the electric grid up to a maximum of 5.5 MW.

The difference between the upper and lower threshold value can define the necessary capacity of the power-to-gas converter and can e.g., be between 35% and 55% of the maximum power rating of the wind turbine.

The discussed maximum power can be the power that is output by the wind turbine or group of wind turbines at very high wind speeds, before it is necessary to shutdown the wind turbine or group of wind turbines.

In an embodiment of the present invention an electrolyzer can be used as the power-to-gas converter to generate hydrogen from water. It is however also possible to generate other gases, e.g., methane.

Besides the inventive method embodiments of the invention also concern a wind turbine or group of wind turbines, comprising at least one generator being electrically coupled to a power-to-gas converter of the wind turbine or group of wind turbines and to coupling means for coupling the generator to an electric grid, wherein the distribution of the electric power between the power-to-gas converter and the electric grid during the operation of the wind turbine or group of wind turbines is determined by a control unit, wherein the control unit is designed to implement the inventive method.

The gas that is generated by the power-to-gas converter can be produced within the wind turbine. It can be stored locally in the wind turbine or in a separate storage facility. It is also possible to ship it to external applications, such as storage facilities, processing plans etc. by e.g., pipelines, trucks or ships. If hydrogen is produced as gas, it can e.g., be converted to other energy sources including methane or ammonia, either directly by the power-to-gas converter itself or by a separate device that could be used locally and powered by the wind turbine or group of wind turbines or by a separate device, e.g. off site. The additional production of gas allows to produce energy to be used in non-electrified sectors such as long-range shipping or aviation.

Since the discussed method and wind turbine or group of wind turbines allows for a more even output of power of a wind turbine or group of wind turbines, a larger amount of power generated by wind turbines can be used in an electric grid that requires a certain amount of available power. Using some of the power to produce gas also allows to reduce the maximum amount of power provided to the electric grid which can be especially advantageous when the wind turbine or group of wind turbines is used in an area where grid capacity is limited. This can e.g., be relevant for offshore wind parks etc.

With embodiments of the discussed invention wind turbines or groups of wind turbines, e.g., offshore wind parks, can be less dependent on the constrains and commercial conditions in the electrical power grid and are able to produce chemical energy, namely gas, at the same time. While the use of an additional power-to-gas converter increases the initial cost, it hedges the risk of sustained low power prices in the electrical grid. Since the overall power output and the fluctuation of the power output is limited, embodiments of the discussed invention also allows for large scale offshore windfarms to be constructed at sites with low grid availability, such as islands.

BRIEF DESCRIPTION

Figure 2:
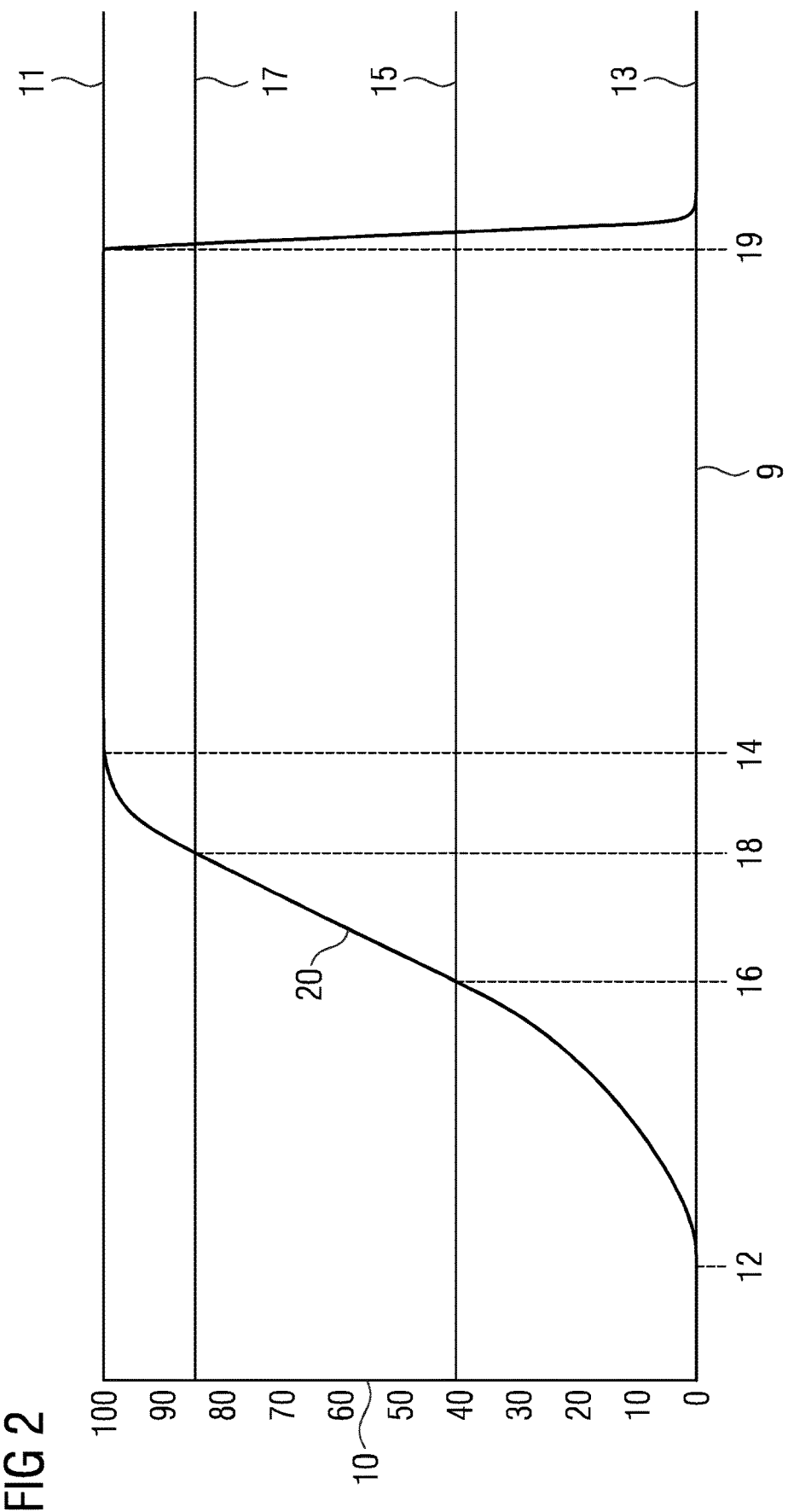

Some of the embodiments will be described in detail, with reference to the following figures, wherein like designations denote like members, wherein:

FIG. 1 an exemplary embodiment of a wind turbine according to the present invention that implements an exemplary embodiment of the method according to the present invention; and FIG. 2 an exemplary output of wind turbine power depending on the wind speed also showing the thresholds for different modes of operation in the wind turbine shown in FIG. 1.

DETAILED DESCRIPTION

FIG. 1 shows a wind turbine 1 that is electrically coupled to a power-to-gas converter 4 and an electric grid 3. As shown the generator 2 is coupled to the electric grid 3 and the power-to-gas converter 4 via a control unit 5 that determines the distribution of the electric power between the power-to-gas converter 4 and the electric grid 3 during the operation of the wind turbine 1. Once a certain minimum wind speed is exceeded the wind can rotate the hub 22 via the wind turbine blades 21 and this rotational energy can be converted into electric power by the generator 2. The output of the generator 2 is typically an alternating current with a frequency that depends on the rotational speed of the hub 22. The power is therefore conditioned before feeding it to the power-to-gas converter 4 that typically should be operated with a direct current and before feeding it to the electric grid 3 that is typically operated at a fixed frequency. The current provided to the electric grid 3 should also have a fixed phase relation to the alternating current in the electric grid 3.

In the example shown in FIG. 1 it is e.g., possible that the control unit or a separate unit that is not shown converts the current provided by the generator 2 into a direct current. Part of this current can be directly fed to the power-to-gas converter 4 and the remaining portion can be fed to the electric grid 3 via means 6 for coupling the generator 2 to the electric grid 3. The means 6 can e.g., comprise a DC/AC-converter that is synchronized to the electric grid to provide an output current with the correct frequency and phase. The power distribution can then e.g., be controlled by controlling the means 6.

Alternatively, it would e.g., be possible to use separate power converters for the electric grid 3 and a power-to-gas converter 4 and to control both power converters to determine the power distribution.

In the example shown in FIG. 1 the power-to-gas converter is connected to two containers 7, 8 arranged within the wind turbine 1. The container 7 can store water or a different material processed to generate the gas and the container 8 can store the generated gas. Alternatively, it would e.g., be possible to provide the source material to the power-to-gas converter 4 by a pipeline or similar means and/or to remove the generated gas by a pipeline or similar means.

The example in FIG. 1 shows a single wind turbine with a single generator 2 having a dedicated control unit 5 and power-to-gas converter 4. It could also be advantageous to use a common control unit 5 and power-to-gas converter 4 for multiple wind turbines 1, e.g., a group of wind turbines in a windfarm.

The distribution of the generated power between the power-to-gas converter 4 and the electric grid 3 will now be explained with reference to FIG. 2. In FIG. 2 the x-axis 9 shows the wind speed and the y-axis 10 shows the power generated by the generator 2 at these wind speeds. The generated power is shown as a percentage of the maximum power 11 that can be provided by the wind turbine 1. The power level 20 stays at a first power level 13 where no power is generated up until a certain wind speed 12. The generated power then increases up to a wind speed 14, at which the maximum power 11 is reached. At this point the generated power saturates until a shutdown is required to avoid damaging components of the wind turbine at a wind speed 19.

The control unit 5 determines the power level 20 for the power generated by the generator 2 and is configured to control the distribution of the power between the electric grid 3 and the power-to-gas converter 4 according to the determined power level 20. The power level 20 can be directly measured or determined from other parameters e.g., from a measured or predicted wind speed or a rotational speed of the hub 22.

Once the determined power level 20 reaches or exceeds a given lower threshold value 15, the control unit feeds at least part of the generated power to the power-to-gas converter, thereby reducing the load on the electric grid. While the determined power level 20 exceeds an upper threshold value 17 the power fed to the power-to-gas converter is kept constant. In other words, a further increase of the determined power level 20 beyond the upper threshold value 17 does not increase the amount of power fed to the power-to-gas converter. The power exceeding the upper threshold value 17 is fed to the electric grid 3. Alternatively, it could be stored in another way, e.g. by batteries.

A constant amount of power is fed to the electric grid 3 when the determined power level 20 is between the lower threshold 15 and the upper threshold 17. This can be achieved by feeding the power that exceeds the lower threshold value 15 exclusively to the power-to-gas converter until the upper threshold value 17 is reached. The power-to-gas converter is not provided with power if the determined power level 20 is below the lower threshold value 15. The maximum amount of power provided to the power-to-gas converter 4 can therefore be the difference between the lower threshold value 15 and the upper threshold value 17.

The discussed threshold values 15, 17 can be fixed at the time of the production of the wind turbine 1, be set by user or be dynamically adjusted. A maximum distance between the threshold values 15, 17 can depend on the capacity of the used power-to-gas converter 4. Since large capacity power-to-gas converters 4 can add noticeably to the cost of the wind turbine 1 the use of an upper threshold 17 to limit the amount of power provided to the power-to-gas converter 4 can noticeably lower the cost of providing the wind turbine 1.

At the same time the discussed approach allows for a constant power output over a wide range of operating conditions. The power output of the wind turbine to the electric grid 3 can be constant between the lower and upper threshold 15, 17 and once the maximum power 11 is reached. It is therefore constant for wind speeds between the wind speed 16 and 18 and between the wind speed 14 and 19. The difference between the upper threshold value 17 and the maximum power is relatively low, e.g., 15% of the maximum power 11 in the example shown in FIG. 2. If the wind turbine 1 e.g., provides an output power of 10 MW, this difference is equivalent to 1.5 MW. By only providing power to the electric grid up to the lower threshold value 15 and once the upper threshold value 17 is exceeded, the power provided to the electric grid 3 therefore only varies by the difference between the upper threshold value 17 and the maximum power 11 once the lower threshold value 15 and therefore a wind speed 16 is exceeded.

In the discussed example the amount of power provided to the electric grid would therefore only vary by 1.5 MW over a large range of operating conditions ranging from wind speed 16 to wind speed 19. A variation of the power provided to the electric grid beyond this amount is therefore limited to rare times with very low wind speeds below the wind speed 16.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for operating at least one wind turbine, the wind turbine being electrically coupled to a power-to-gas converter and an electric grid, the method comprising:
   determining a power level for power generated by at least one generator of the at least one wind turbine;
   feeding a first portion of the power generated by the at least one generator to the electric grid when the determined power level is below a given lower threshold value;
   feeding a second portion of the power generated by the at least one generator to the power-to-gas converter when the determined power level reaches or exceeds the given lower threshold value but is below a given upper threshold value; and
   feeding a third portion of the power generated by the at least one generator to the electric grid and/or to storage when the determined power level reaches or exceeds the given upper threshold value;
   wherein the second portion of the power generated by the at least one generator fed to the power-to-gas converter is kept constant when the determined power level reaches or exceeds the given upper threshold value.

2. The method according to claim 1, wherein a constant amount of power is fed to the electric grid when the determined power level is between the lower threshold value and the upper threshold value by varying the second portion of power generated by the at least one generator fed to the power-to-gas converter.

3. The method according to claim 1, wherein all of the power generated by the at least one generator not used for the operation of the wind turbine itself is fed to the electric grid when the determined power level is at or below the lower threshold value.

4. The method according to claim 1, wherein the upper and/or lower threshold value are determined during production of the wind turbine and/or depend on a power rating of the power-to-gas converter and/or are manually adjusted by a user.

5. The method according to claim 1, wherein the at least one wind turbine is designed to provide a given maximum power, wherein the lower threshold value corresponds to between 30% and 50% of the maximum power and/or wherein the upper threshold value corresponds to 75% to 95% of the maximum power.

6. The method according to claim 1, wherein an electrolyser is used as the power-to-gas converter to generate hydrogen from water.

7. A wind turbine or group of wind turbines, comprising:
   at least one generator being electrically coupled to a power-to-gas converter of the wind turbine or group of wind turbines and to coupling means for coupling the generator to an electric grid, and
   a control unit, wherein distribution of electric power between the power-to-gas converter and the electric grid during the operation of the wind turbine or group of wind turbines is determined by the control unit, wherein the control unit is configured to determine a power level for power generated by the at least one generator, to feed a first portion of the power generated by the at least one generator to the electric grid when the determined power level is below a given lower threshold value, to feed a second portion of the power generated by the at least one generator to the power-to-gas converter when the determined power level reaches or exceeds the given lower threshold value, and to feed a third portion of the power generated by the at least one generator to the electric grid and/or to storage when the determined power level reaches or exceeds the given upper threshold value, wherein the second portion of power generated by the at least one generator fed to the power-to-gas converter is kept constant when the determined power level reaches or exceeds the given upper threshold value.

* * * * *